United States Patent [19]

Gandini et al.

[11] Patent Number: 4,604,740
[45] Date of Patent: Aug. 5, 1986

[54] DIGITAL TRANSCEIVER FOR FULL-DUPLEX TRANSMISSION OF BINARY SIGNALS OVER A COMMON LINE

[75] Inventors: Marco Gandini; Mario Sartori, both of Turin, Italy

[73] Assignee: Cselt - Centro Studi e Laboratori Telecomunicazioni S.p.A., Turin, Italy

[21] Appl. No.: 585,567

[22] Filed: Mar. 2, 1984

[30] Foreign Application Priority Data

Mar. 4, 1983 [IT] Italy .............................. 67245 A/83

[51] Int. Cl.[4] .............................................. H04L 5/14
[52] U.S. Cl. ......................................... 370/27; 370/32
[58] Field of Search .............................. 370/24, 27, 32

[56] References Cited

U.S. PATENT DOCUMENTS

Re. 30,111 10/1979 Blood, Jr. .............................. 370/27

Primary Examiner—Douglas W. Olms
Attorney, Agent, or Firm—Karl F. Ross; Herbert Dubno

[57] ABSTRACT

A transceiver inserted between a source of binary signals and a one-wire line, dialoguing with a similar transceiver in series with another source at the opposite end of the line, comprises two voltage sensors connected in parallel to the line at a point downstream of a terminal impedance at which the line voltage substantially equals the mean of the voltage levels simultaneously generated by the two sources. The two voltage sensors have thresholds respectively lying at a lower and an upper intermediate level between the two binary signal levels (L, H) employed and work into a common signal receiver through a multiplexer so controlled by the local source as to connect that receiver always to that detector whose low or high output signal corresponds to the binary value (L, H) of the signal then arriving from the remote source.

8 Claims, 5 Drawing Figures the sensor disconnected from the receiver, being immaterial, have not been included.

DIGITAL TRANSCEIVER FOR FULL-DUPLEX TRANSMISSION OF BINARY SIGNALS OVER A COMMON LINE

FIELD OF THE INVENTION

Our present invention relates to a circuit arrangement, forming part of a digital transceiver, which is associated with a local source of outgoing binary signals adapted to enter into full-duplex communication with a remote source of similar character for the exchange of outgoing and incoming signals by way of a single transmission line.

BACKGROUND OF THE INVENTION

Transceivers of the general type here considered are the subject matter of commonly owned U.S. Pat. Nos. 4,162,371 and 4,393,494. Both systems operate essentially in an analog mode, even though the first of these patents discloses the use of an analog/digital and digital/analog converters enabling digital signal processing. The two patents and the art cited therein also show that it is advantageous to realize such a transceiver, or parts thereof, in integrated circuitry.

OBJECT OF THE INVENTION

The object of our present invention is to provide an entirely digital circuit arrangement for the extraction of incoming binary signals in such a full-duplex system without the need of a conversion from analog to digital or vice versa.

SUMMARY OF THE INVENTION

We realize this object, in a system in which outgoing and incoming binary signals simultaneously appearing on a single transmission line alternate between a low voltage level (L) and a high voltage level (H), by providing a first and a second voltage sensor whose inputs are connected in parallel to a tap of the transmission line whose instant voltage approximately corresponds to the mean $(L+H)/2$ of these voltage levels, the first sensor having a threshold lying at a lower intermediate level between levels L and H while the second sensor has a second threshold lying at a higher intermediate level between them. A multiplexer controlled by a local source selectively connects an input of a local signal receiver to either of these voltage sensors, in dependence upon the voltage level of the outgoing binary signals, for supplying the receiver at all instants with an output signal from the respective sensor which varies in conformity with the voltage level of the incoming binary signal.

With a median voltage level equal to $(L+H)/2$ the two thresholds advantageously lie at $(L+H)/4$ and $3(L+H)/4$, respectively. This median level $(L+H)/2$ may then be the response threshold of a line driver which transmits the outgoing binary signals and preferably has a signal input connected in parallel with the control input of the multiplexer to the local source. The line driver, the voltage sensors and the multiplexer could form part of an integrated transceiver module.

BRIEF DESCRIPTION OF THE DRAWING

The above and other features of our invention will now be described in detail with reference to the accompanying drawing in which.

SPECIFIC DESCRIPTION

Figure 1:
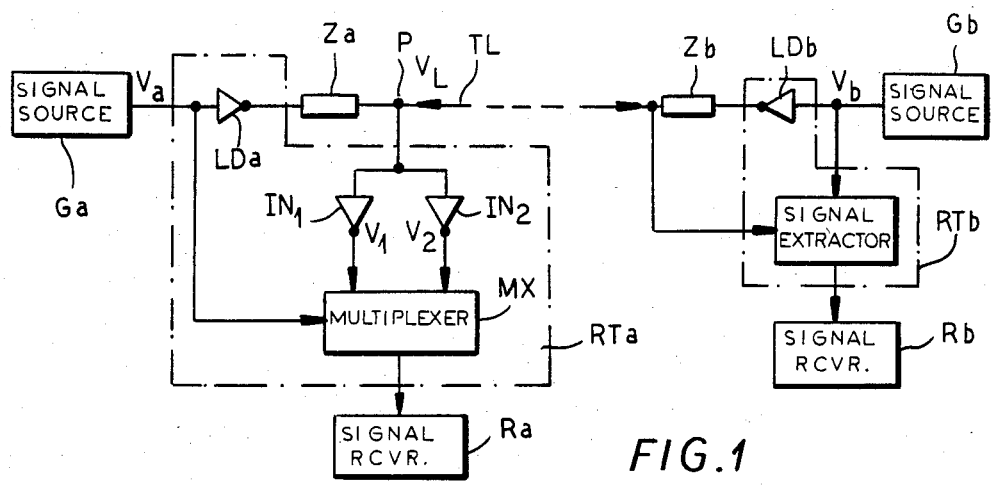
FIG. 1 is a circuit diagram of a full-duplex digital transmission system including a transceiver according to our invention.

In FIG. 1 we have shown a transmission line TL, consisting of a single wire, over which a local source Ga and a remote source Gb of binary signals communicate with each other. Associated with each source is a respective signal receiver Ra, Rb and an intervening transceiver module RTa, RTb; each transceiver includes a line driver LDa, LDb and a signal extractor, more fully described hereinafter with reference to transceiver RTa, working into the associated receiver. There is further shown, at the output of each line driver, a respective terminating impedance Za, Zb.

Figure 2A:
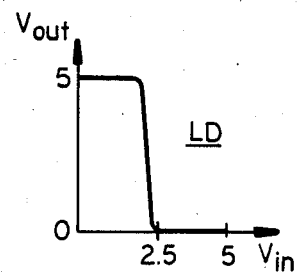
FIGS. 2a, 2b and 2c are graphs showing the response threshold of respective components of the transceiver.
Figure 2B:
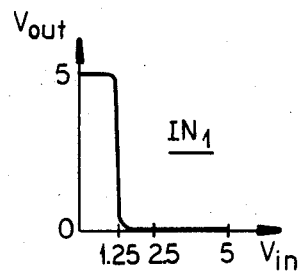
Figure 2C:
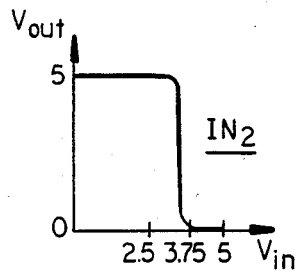

Each source Ga, Gb generates a respective binary voltage $V_a$, $V_b$ alternating between a low level L and a high level H, level L being preferably the ground potential of 0 V. With $H=+5$ V by way of example, the inverting line drivers LDa and LDb will send output voltage $V_{out}$ onto the line only in response to input voltages $V_{in}$ below $+2.5$ V as indicated in FIG. 2a. The two terminating impedances Za and Zb each act as a voltage divider which halves the sum of the output voltages of the two line drivers to produce a line voltage $V_L=(V_a+V_b)/2$ at a point P just downstream of impedance Za (as viewed in the direction of outgoing signals) and at a corresponding point at the remote station. Point P is connected in parallel to the inputs of respective voltage sensors $IN_1$, $IN_2$, also designed as inverters, with respective thresholds of $+1.25$ V and $+3.75$ V so as to generate an output voltage—again assumed to equal $+5$ V—only when the line votlage $V_L$ at their inputs lies below that threshold; this has been illustrated in FIG. 2b for voltage sensor $IN_1$ and in FIG. 2c for voltage sensor $IN_2$. The outputs of the two sensors are connected to respective inputs of a multiplexer MX whose control input is tied to the output of source Ga in parallel with the signal input of driver LDa. When voltage level $V_a$ is high, multiplexer MX supplies the output voltage $V_1$ of sensor $IN_1$ to signal receiver Ra; when that level is low, the output voltage $V_2$ of sensor $IN_2$ is fed to the receiver. The two sensors and the multiplexer together form the equivalent of the signal extractor included at the remote station in receiver RTb.

The following Truth Table I represents the relationship between the source voltages $V_a$, $V_b$ and line voltage $V_L$, on the one hand, and the extracted voltages $V_1$, $V_2$ fed to the receiver, on the other hand. The Table also shows, in parentheses, the respective binary levels of voltages $V_a$, $V_b$ and $V_1$, $V_2$. The voltages emitted by the sensor disconnected from the receiver, being immaterial, have not been included.

Truth TABLE I

| $V_a$ | $V_b$ | $V_L$ | $V_1$ | $V_2$ |
| --- | --- | --- | --- | --- |
| 0 (L) | 0 (L) | +5 | — | 0 (L) |
| 0 (L) | +5 (H) | +2.5 | — | +5 (H) |
| +5 (H) | 0 (L) | +2.5 | 0 (L) | — |
| +5 (H) | +5 (H) | 0 | +5 (H) | — |

A comparison of the second column of the foregoing table with its fourth and fifth columns shows that the voltage level $V_2$ delivered to the receiver corresponds at all times to the voltage $V_b$ generated by the remote source Ga, and vice versa, regardless of the output voltage $V_a$ of the local source.

Figure 3:
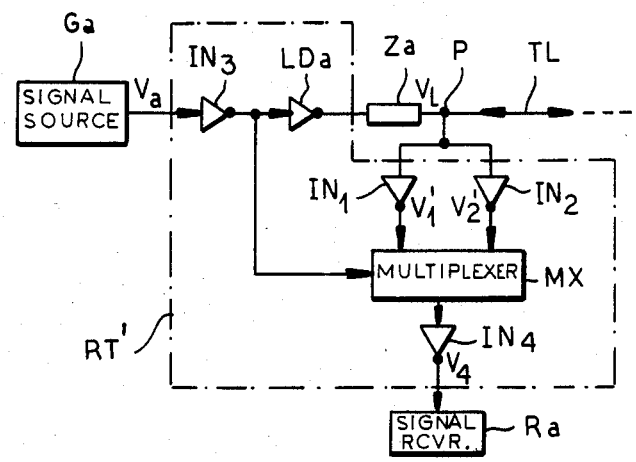
FIG. 3 is a circuit diagram of a modified transceiver according to our invention.

The same result could be obtained if drivers LDa, LDb and voltage sensors $IN_1$, $IN_2$ were of noninverting character. In fact, they have been shown as inverters only for reasons inherent in integrated-circuit technology. An equivalent transceiver RT', using two additional inverters $IN_3$, $IN_4$, has been shown in FIG. 3. Inverter $IN_3$ is inserted in cascade with line driver LDa between the latter and source Ga, its output being connected to the control input of multiplexer MX. Inverter $IN_4$ has been interposed between the output of that multiplexer and the signal receiver Ra. Both inverters $IN_3$, $IN_4$ have the same threshold of +2.5 V as line driver LDa.

The following Truth Table II correlates the output voltage $V_1'$ and $V_2'$ of sensors $IN_1$, $IN_2$ of module RT' as well as the corresponding output voltage $V_4$ of inverter $IN_4$ with source voltages $V_a$ and $V_b$. Voltage $V_4$ in the inverted multiplexer output again equals the signal voltage $V_b$ generated by the remote source, regardless of the concurrent level of the locally generated voltage $V_a$.

Truth TABLE II

| $V_a$ | $V_b$ | $V_L$ | $V_1'$ | $V_2'$ | $V_4$ |
|---|---|---|---|---|---|
| 0 (L) | 0 (L) | 0 | +5 (H) | — | 0 (L) |
| 0 (L) | +5 (H) | +2.5 | 0 (L) | — | +5 (H) |
| +5 (H) | 0 (L) | +2.5 | — | +5 (H) | 0 (L) |
| +5 (H) | +5 (H) | +5 | — | 0 (L) | +5 (H) |

We claim:

1. A full-digital circuit arrangement connected with a local source of outgoing binary signals for the detection of incoming binary signals from a remote source communicating with said local source by way of a single tapped transmission line, said binary signals alternating between a low voltage level and a high voltage level, said circuit arrangement comprising:

a line driver and a terminating impedance connected in series between the local source and the tap of the transmission line, the impedance reducing the voltage of the signal of the line driver, whereby the voltage at the tap is proportional to the sum of the voltages of concurrent incoming and outgoing signals;

first and second logic-element voltage sensors with respective inputs connected in parallel to the tap of said transmission line, said first voltage sensor having a threshold lying at a lower intermediate level between said low voltage level and a median level of said high and low voltage levels, said second voltage sensor having a respective second threshold lying at a higher intermediate level between said median and high voltage levels;

a local signal receiver having an input; and switch means controlled by said local source for selectively connecting the input of the local signal receiver only to the first voltage sensor when the signal of the local source is at the low voltage level and for connecting the input of the local signal receiver only to the second voltage sensor when the signal of the local source is at the high voltage level and for thereby supplying said signal receiver at all instants with an output signal from the respective voltage sensor varying in conformity with the voltage level of an incoming binary signal.

2. A circuit arrangement in claim 1 wherein said lower intermediate level lies substantially midway between said low voltage level and the median level of said low and high voltage levels, said higher intermediate level lying substantially midway between said median level and said high voltage level.

3. A circuit arrangement as defined in claim 2 wherein the line driver has a threshold corresponding to said median level.

4. A circuit arrangement as defined in claim 3 wherein said line driver and said voltage sensors are logical inverters.

5. A circuit arrangement as defined in claim 4 wherein said switch means has a control input connected to said local source in parallel with a signal input of said line driver.

6. A circuit arrangement as defined in claim 5 wherein said control input is connected to said local source by way of a further inverter between said local source and said line driver.

7. A circuit arrangement as defined in claim 6, further comprising an additional inverter interposed between said switch means and said signal receiver.

8. A circuit arrangement as defined in claim 3 wherein said line driver, said voltage sensors and said switch means are part of an integrated transceiver module.

* * * * *